(12) United States Patent
Iwanczyk et al.

(10) Patent No.: US 8,513,617 B2
(45) Date of Patent: Aug. 20, 2013

(54) EDGE-ON TWO-DIMENSIONAL DETECTOR ARRAYS

(75) Inventors: Jan S. Iwanczyk, Los Angeles, CA (US); Einar Nygard, Asker (NO); Valeri D. Saveliev, Palmdale, CA (US)

(73) Assignee: Dxray, Inc., Northridge, CA (US)

( * ) Notice: Subject to any disclaimer, the term of this patent is extended or adjusted under 35 U.S.C. 154(b) by 90 days.

(21) Appl. No.: 13/115,906

(22) Filed: May 25, 2011

(65) Prior Publication Data

US 2011/0291020 A1 Dec. 1, 2011

Related U.S. Application Data

(60) Provisional application No. 61/348,221, filed on May 25, 2010.

(51) Int. Cl.
*G01T 1/00* (2006.01)
(52) U.S. Cl.
USPC ......................................... 250/394

(58) Field of Classification Search
USPC ................ 250/394, 370.08, 370.09, 370.11, 250/367, 363.03
See application file for complete search history.

(56) References Cited

U.S. PATENT DOCUMENTS

| | | | |
|---|---|---|---|
| 7,157,014 B1 * | 1/2007 | Andreaco et al. | 216/24 |
| 2003/0030004 A1 * | 2/2003 | Dixon et al. | 250/370.09 |
| 2010/0187429 A1 * | 7/2010 | Engel et al. | 250/370.09 |
| 2010/0270462 A1 * | 10/2010 | Nelson et al. | 250/252.1 |

* cited by examiner

*Primary Examiner* — David Porta
*Assistant Examiner* — Faye Boosalis
(74) *Attorney, Agent, or Firm* — Christie, Parker & Hale, LLP

(57) ABSTRACT

A two dimensional radiation detector array includes a plurality of detector cards, each of the detector cards including: a plurality of radiation detectors arranged in a linear array; and a plurality of amplifiers, each of the amplifiers being electrically coupled to a respective one of the plurality of radiation detectors; and a separator between first and second detector cards of the plurality of detector cards.

22 Claims, 18 Drawing Sheets

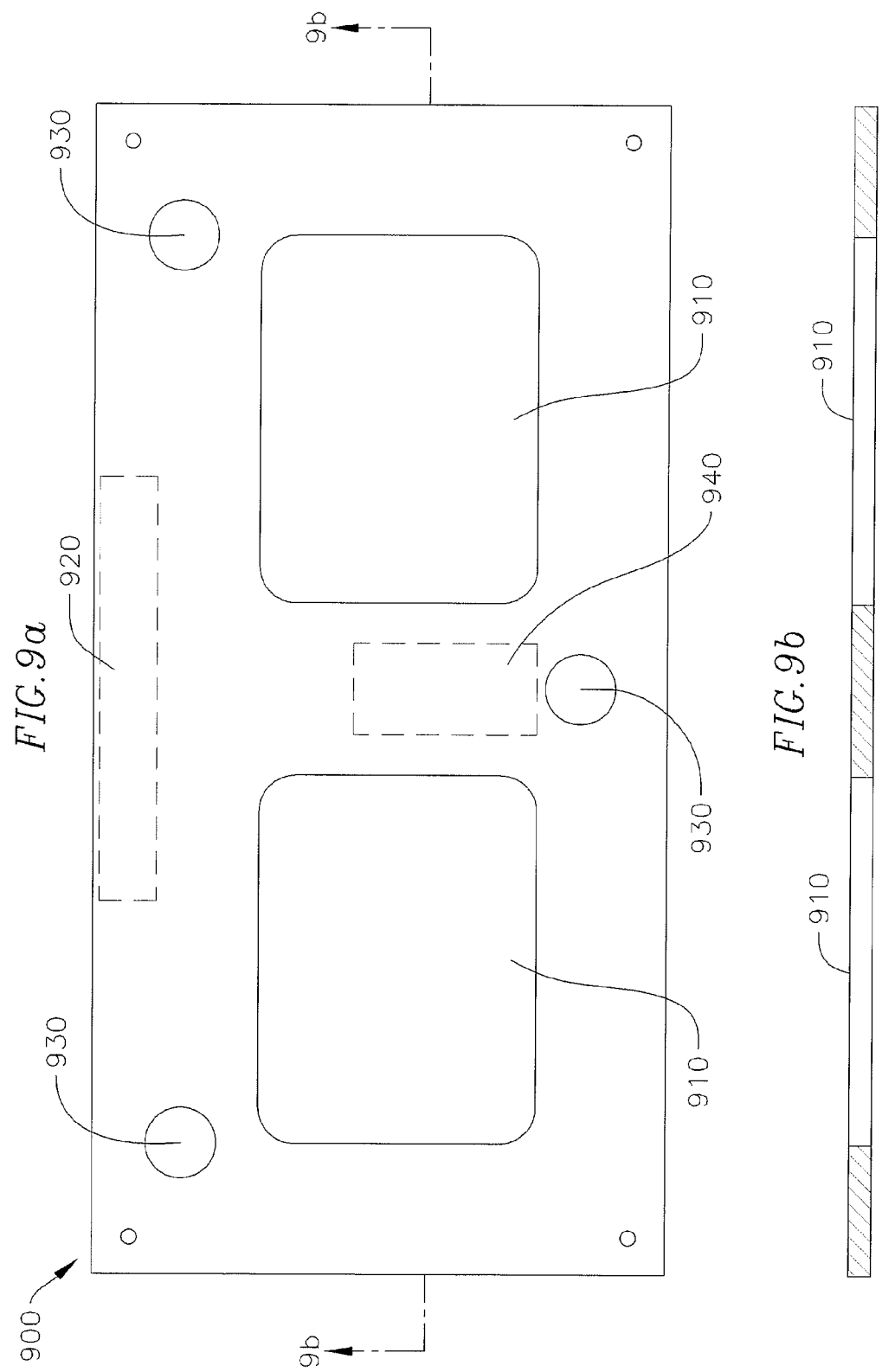

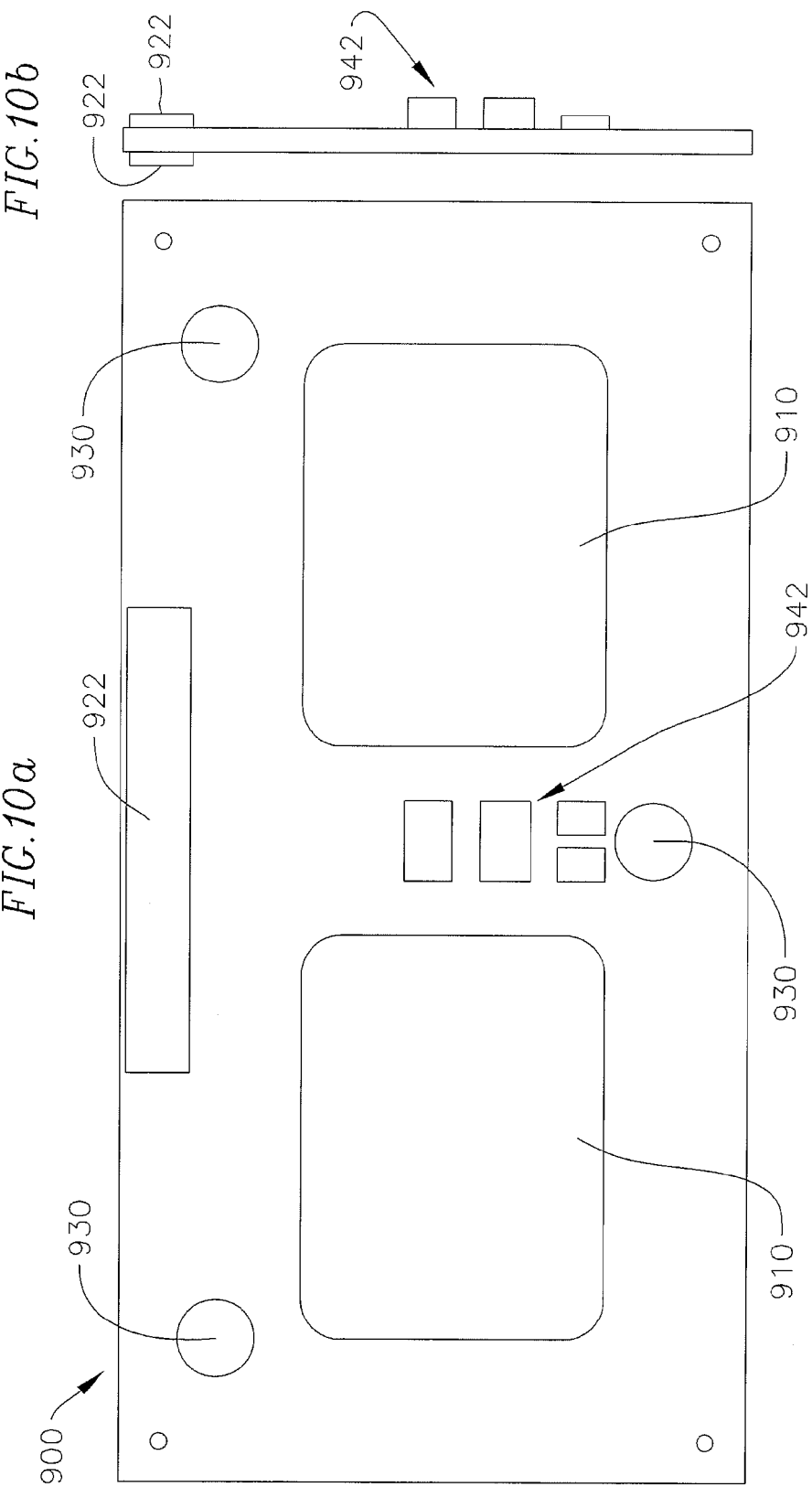

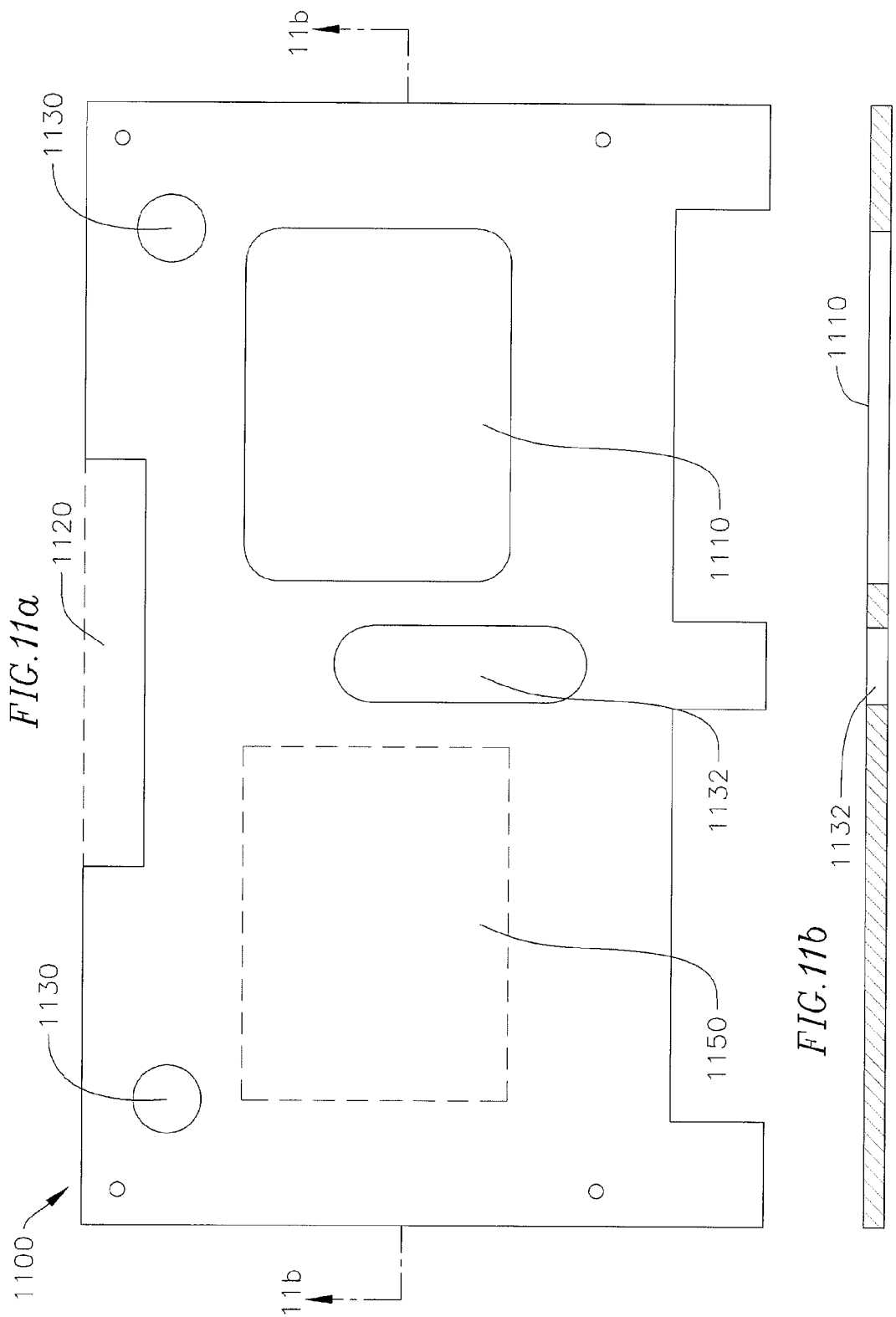

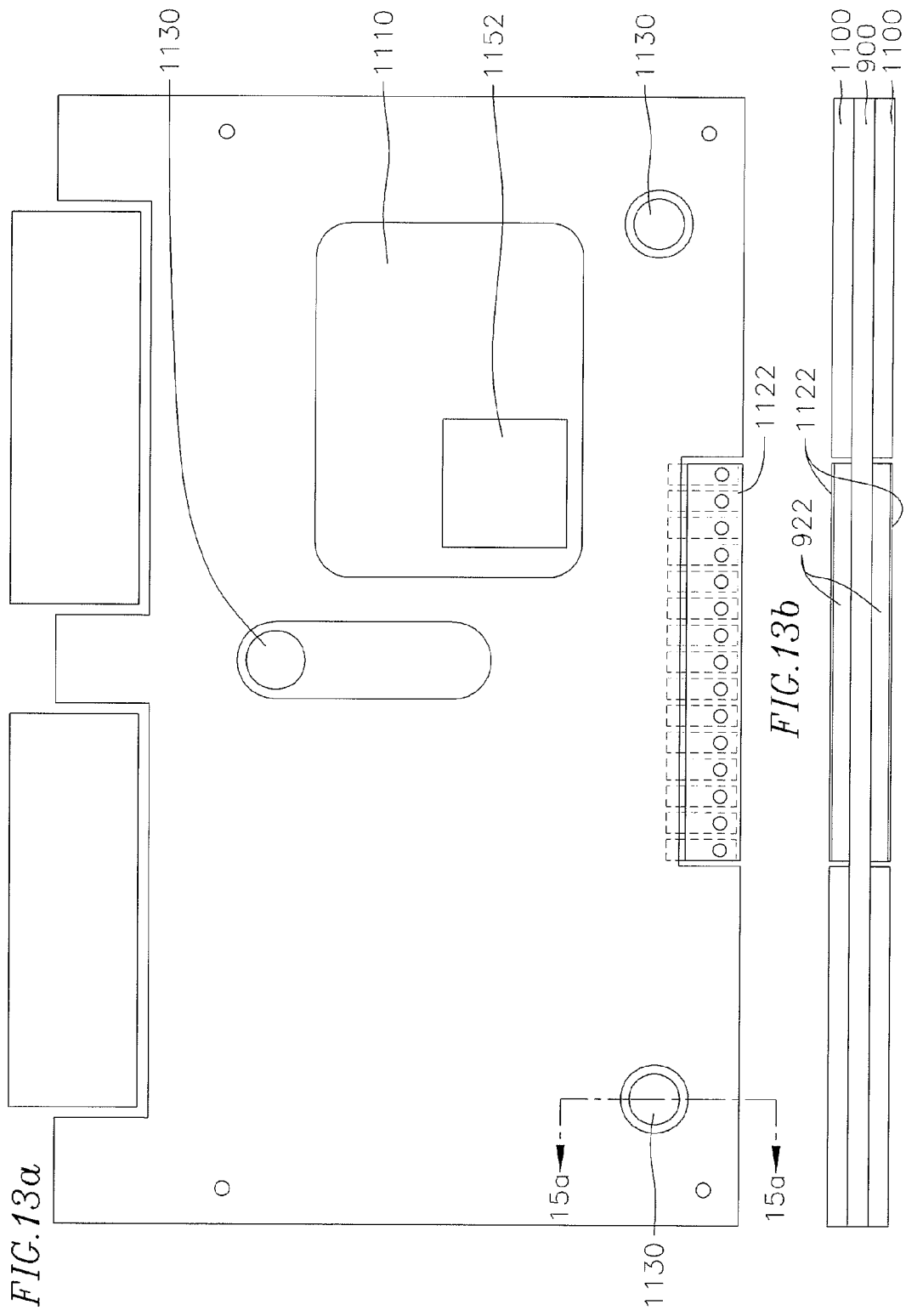

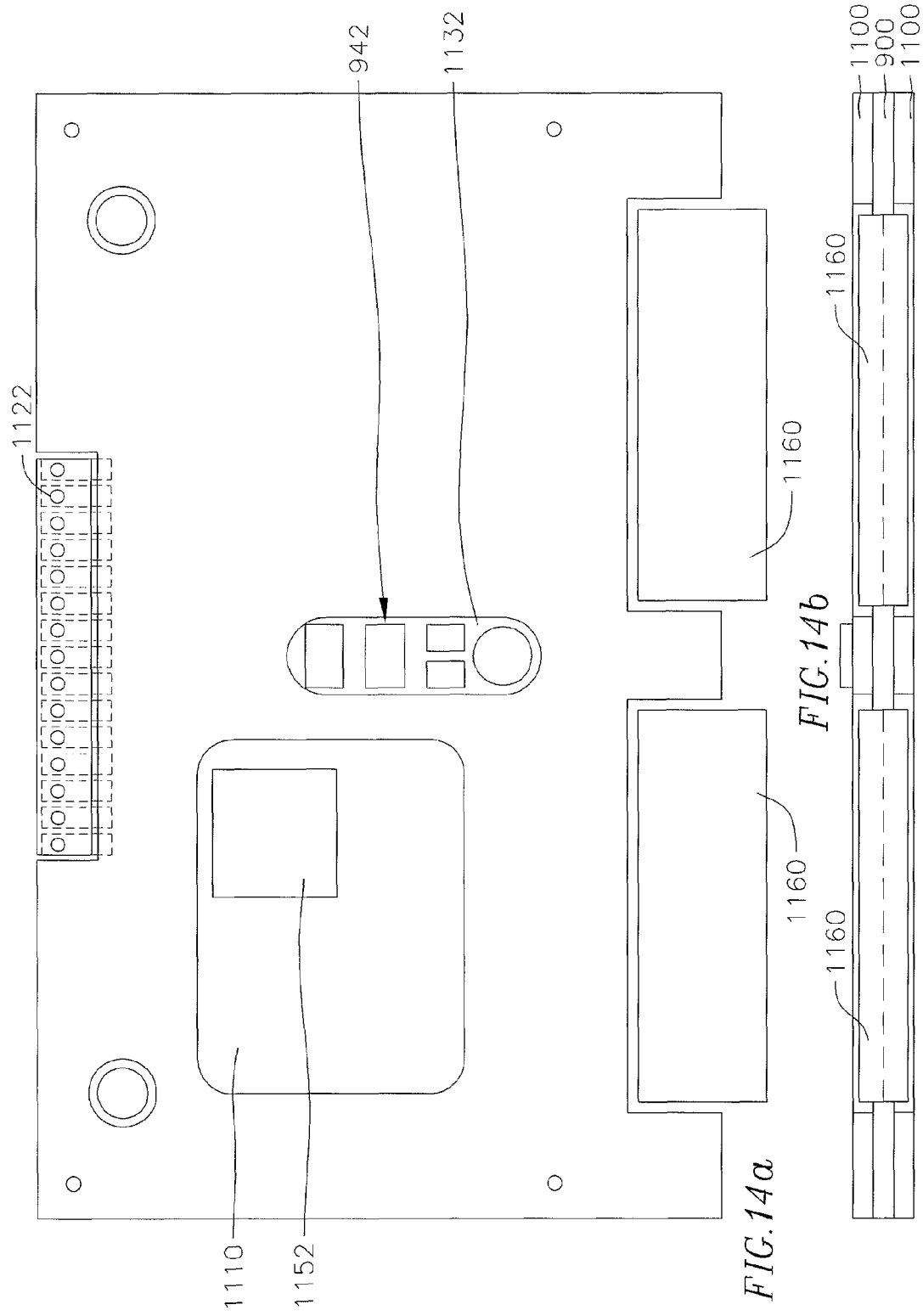

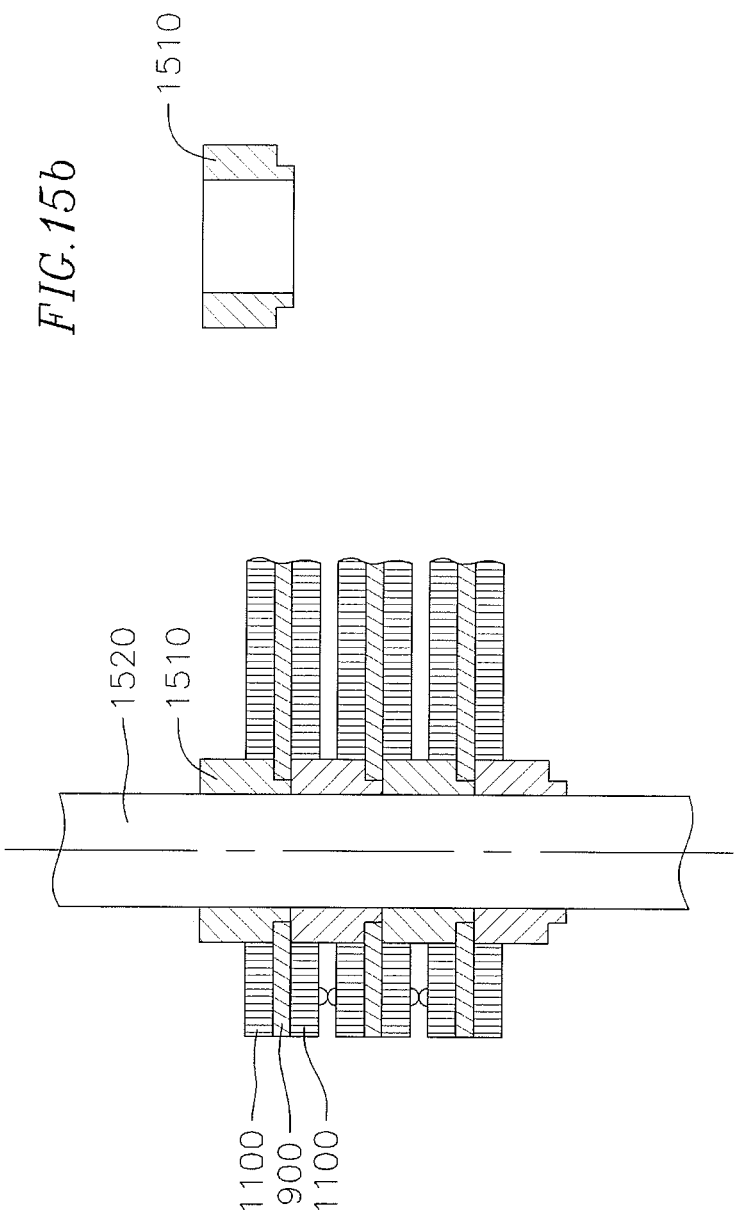

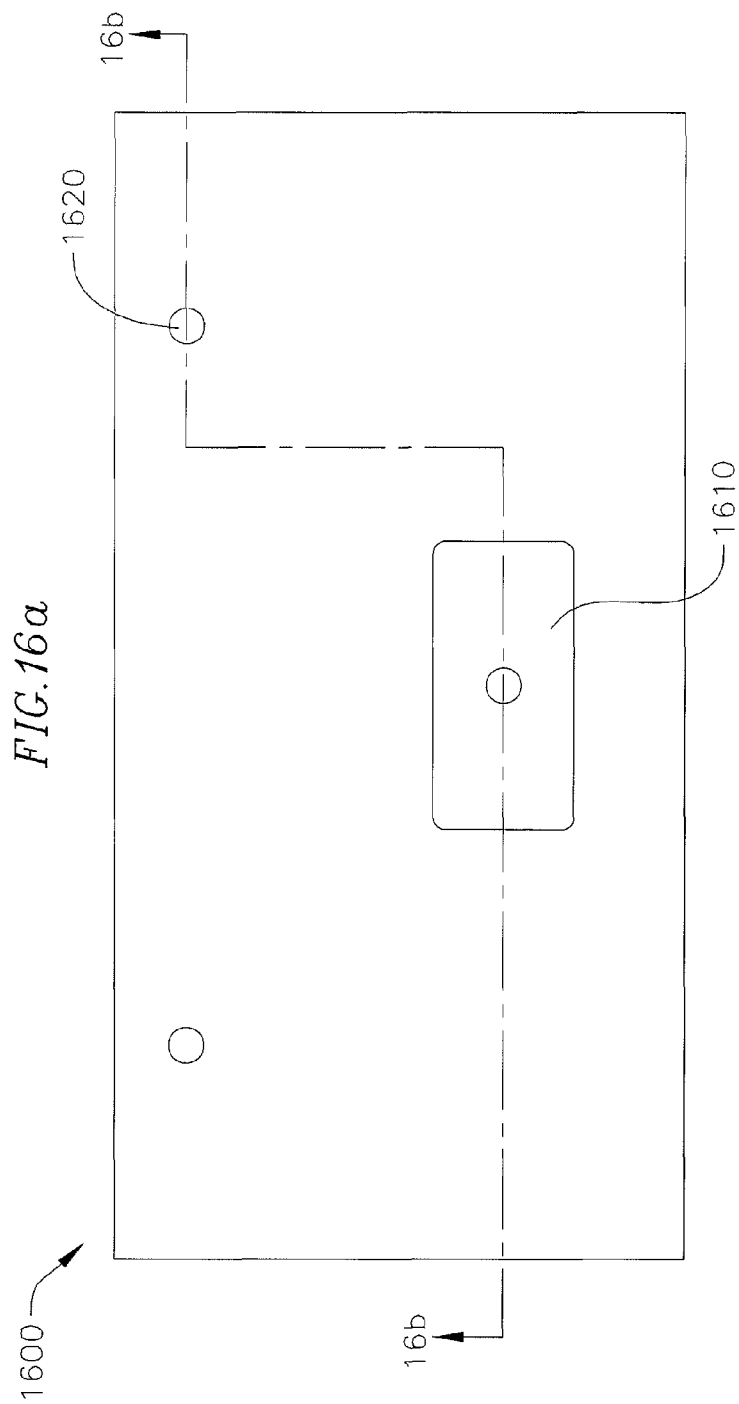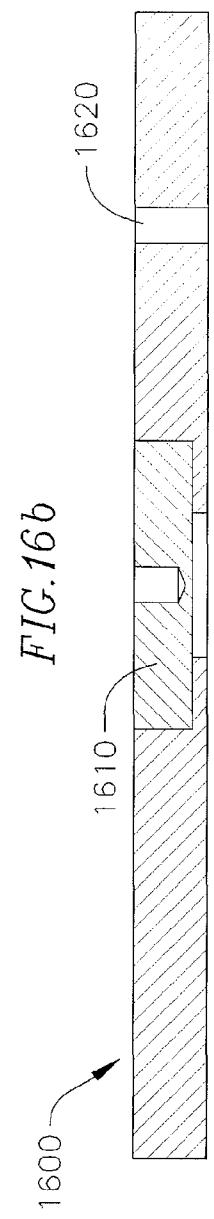

EDGE-ON TWO-DIMENSIONAL DETECTOR ARRAYS

CROSS-REFERENCE TO RELATED APPLICATIONS

This application claims priority to and the benefit of U.S. Patent Application No. 61/348,221, filed on May 25, 2010, entitled "Edge-on Two-dimensional Detector Arrays," the entire content of which is incorporated herein by reference.

BACKGROUND

A typical configuration of semiconductor ionization radiation detectors and detector arrays is such that the incoming radiation passes an entrance electrode and interacts with the detector volume. The direction of the detected radiation is usually parallel or close to parallel to the electrical field lines within the volume of the detector (e.g., perpendicular to the detector electrodes). The electric field in the detector volume is created by a bias voltage applied to the detector electrodes.

There are also examples where detectors are specifically configured with electrodes parallel to incoming radiation and the direction of incoming photons is perpendicular to electric field lines within the detector. One such example is an edge-on configuration for either a single pixel or a linear array.

SUMMARY

In one embodiment of the present invention, a two dimensional radiation detector array includes: a plurality of detector cards, each of the detector cards including: a plurality of radiation detectors arranged in a linear array; and a plurality of amplifiers, each of the amplifiers being electrically coupled to a respective one of the plurality of radiation detectors; and a separator between first and second detector cards of the plurality of detector cards.

Each of the detector cards may be coupled to a first separator at a first side and a second separator at a second side, the first separator being adapted to electrically couple the plurality of radiation detectors to the plurality of amplifiers at the first side and the second separator adapted to supply a bias voltage to the plurality of radiation detectors at the second side.

The separator may be a common separator and may be adapted to provide a bias voltage to the radiation detectors of both the first and second detector cards.

In this embodiment, the radiation detector array may further include a first pixel separator and a second pixel separator, wherein the first pixel separator is located at a side of the first detector card opposite the common separator and is adapted to electrically couple the plurality of radiation detectors of the first detector card to the plurality of amplifiers of the first detector card, and wherein the second pixel separator is located at a side of the second detector card opposite the common separator and is adapted to electrically couple the plurality of radiation detectors of the second detector card to the plurality of amplifiers of the second detector card.

In an alternative embodiment only one separator is used between the first and second detector cards. This separator is common to both cards and electrically couples the plurality of radiation detector pixels to the plurality of amplifiers in the first card and providing the bias voltage to the second card.

The separator may include a hard printed circuit board, or a flexible printed circuit board, or a combination thereof.

Each of the detector cards may further include a frame adapted to accommodate the plurality of radiation detectors and the plurality of amplifiers.

The separator may electrically couple the plurality of radiation detectors of the second detector card to the plurality of amplifiers of the second detector card.

Each of the detector cards may include a first edge and a second edge; and the plurality of amplifiers of the first detector card may be located on the first edge of the first detector card and the plurality of amplifiers of the second detector card may be located on the second edge of the second detector card.

BRIEF DESCRIPTION OF THE DRAWINGS

The accompanying drawings, together with the specification, illustrate exemplary embodiments of the present invention, and, together with the description, serve to explain the principles of the present invention.

FIG. 9a is a schematic plan view of a first side of a common separator according to one embodiment of the present invention.

FIG. 9b is a schematic cross sectional view of the common separator of the embodiment of FIG. 9a taken along the line 9b-9b.

FIG. 10a is a schematic plan view of a second side of the common separator of the embodiment shown in FIG. 9a.

FIG. 10b is a schematic side view of the common separator of FIG. 9a with attached detectors and high voltage components, according to one embodiment of the present invention.

FIG. 11a is a schematic plan view of a pixel separator according to one embodiment of the present invention.

FIG. 11b is a schematic cross sectional view of the pixel separator of the embodiment of FIG. 11a taken along the line 11b-11b.

FIG. 13a is a schematic plan view of a first side of an assembly including the common separator of the embodiment FIG. 9a between two pixel separators of the embodiment of FIG. 11a according to one embodiment of the present invention.

FIG. 13b is a view of an edge portion of the assembly of FIG. 13a.

FIG. 14a is a plan view of a second side of the assembly of FIG. 13a.

FIG. 14b is a view of an edge portion of the assembly of FIG. 13a.

FIG. 15a is a cross sectional view of a plurality of stacked spacer layers and detector boards separated by spacers taken along the line 15a-15a of FIG. 13a according to one embodiment of the present invention.

FIG. 15b is a cross sectional view of a spacer according to one embodiment of the present invention.

FIG. 16a is a plan view of a mounting plate according to one embodiment of the present invention.

FIG. 16b is a cross sectional view of the mounting plate of FIG. 16a taken along the line 16b-16b.

DETAILED DESCRIPTION

Figure 1:
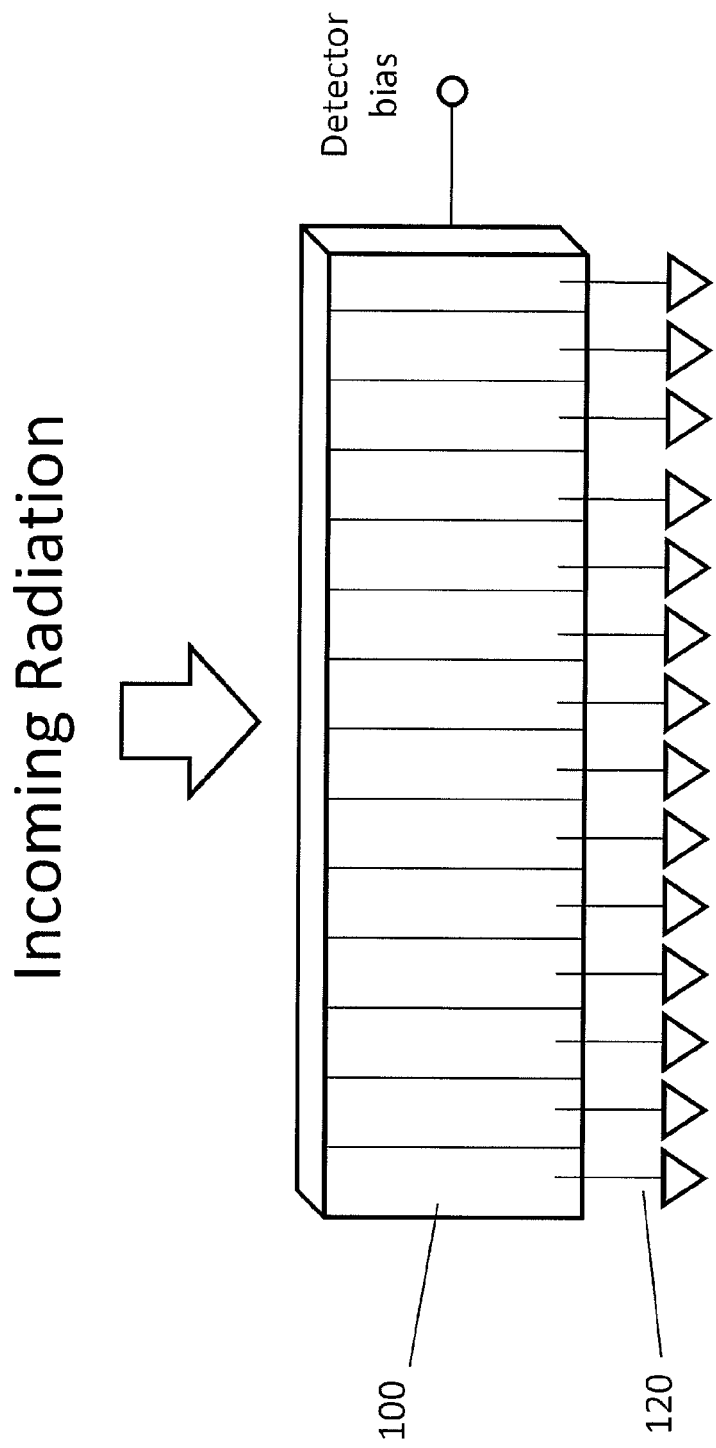
FIG. 1 is a schematic diagram of a linear array of radiation detectors coupled to amplifiers according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the another element or be indirectly on the another element with one or more intervening elements interposed therebetween. Like reference numerals designate like elements throughout the specification.

There are a number of different implementations of edge-on detectors described in literature using silicon (Si) or other semiconductor materials. Also, there are several different motivations behind the selection of an edge-on detector configuration. In case of Si, it is very difficult to obtain p-i-n detector structures that are much thicker than 1 mm. Moreover, 0.3 mm or 0.5 mm thick structures are more typical. Unfortunately these relatively thin structures may have very reduced detection efficiency for x-rays with energies above 10 keV. By setting a detector in the edge-on configuration it is possible to produce long pixels of several millimeters and to provide a sufficient absorption length along an x-ray beam direction to ensure nearly constant and high quantum efficiency for x-ray energies used, for example, in mammography up to 40 keV.

Another example is the use of Cadmium Telluride (CdTe) and Cadmium Zinc Telluride (CZT) in edge-on configuration. It is possible to construct detector arrays with high detection efficiency for high energy x-rays and gamma rays and at the same time preserve good charge collection and excellent spectroscopic capabilities. CdTe or CZT pixels (or radiation detectors) can provide a sufficient absorption length along the beam direction (several mm) and liberated charges by ionizing radiation (electron and holes) are collected perpendicularly to the beam direction by electrodes situated on the detector surfaces parallel with the beam.

The distance between electrodes (thickness of the crystal) can be 1 mm or less to improve charge collection (reduce or minimize trapping effect) and provide a good spectroscopic performance. The edge-on configuration is specifically advantageous with the use of CdTe with Schottky or p-i-n structures. These structures provide an exquisite spectroscopic performance but are plagued by an inherent "polarization effect" favoring smaller thickness detectors. This polarization effect (time instability) can be effectively mitigated with detectors having a thickness of about 1 mm or less. For this reason edge-on CdTe Schottky detectors can provide both very good detection efficiency for a large range of x-ray and gamma ray radiation energies and an excellent energy resolution.

Many applications require two dimensional (2D) detector arrays with a reduced or small (e.g., minimum) amount of dead space between pixels (or radiation detectors). A construction of a single pixel or linear array of radiation detectors 100 in an edge-on configuration is relatively straightforward (see FIG. 1). On the other hand, the construction of densely packaged (or packed) two dimensional (2D) detector arrays using an edge-on configuration is not simple. The edge-on detector may be used with a rigid supporting substrate and electrical connections to electrodes situated on both sides of the crystal. Also, the edge-on configuration makes it very difficult to interconnect detector pixels with the corresponding amplification and processing electronics 120 and at the same time provide sufficiently small dead spaces between the pixels in 2D arrays. The supporting substrate structures and conventional electrical connections severely limit how closely the detectors can be sandwiched (or stacked) together into a 2D array and introduce very substantial dead space. Conventional methods of detector mounting and electrode contacting allow only for a very sparse placement of detectors and impose a very severe limit on use of edge-on configuration for 2D detector array applications. For this reason most edge-on detectors are used only as a single pixel or as a linear array in linear scanners.

Figure 2:
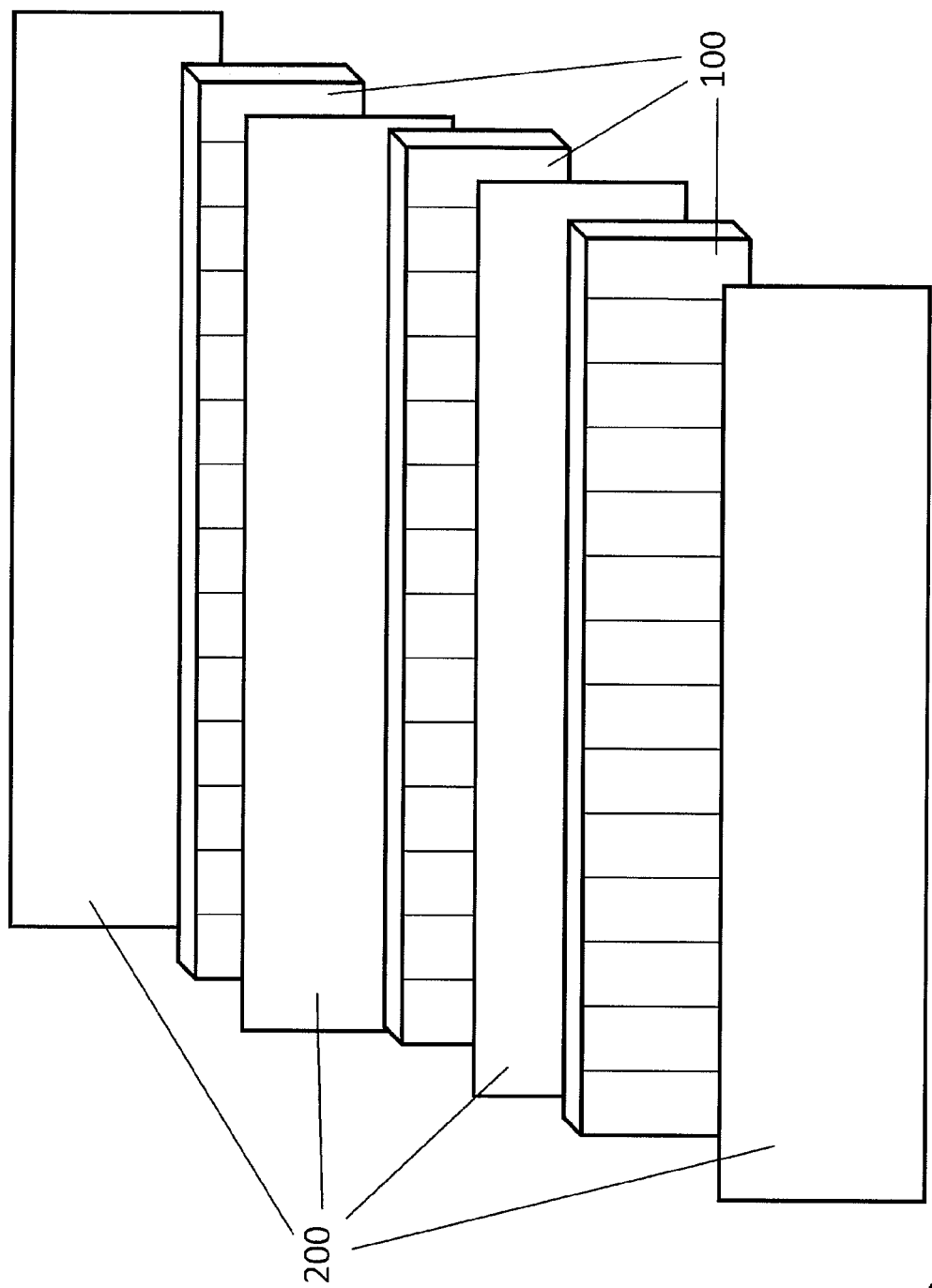
FIG. 2 is an exploded schematic diagram of a plurality of separators and plurality of linear arrays of radiation detectors, each of the linear arrays of radiation detectors being located between adjacent separators, according to one embodiment of the present invention.

In an exemplary embodiment of the present invention, a 2D detector array includes a plurality of linear detector arrays 100 in an edge-on configuration sandwiched between thin film separators 200 as shown in FIG. 2. The separators 200 provide electrical connections to the detector array and at the same time assure (or provide) electrical isolation between the individual array pixels (e.g., by preventing shorting). The separator 200 on one side of the detector linear array 100 provides a bias voltage whereas, on the other side of the detector array, the separator 200 provides a connection between individual detector pixels and corresponding amplification and signal processing electronics 120.

In one embodiment, each of the detector linear arrays 100 has two dedicated separators placed on respective sides of the array providing electrical connections to the detector electrodes. In another embodiment, there is only one separator 200 between neighboring linear arrays 100 and this separator 200 provides electrical connections to both arrays.

In one of the embodiments, separators 200 can be constructed using printed circuit flex board technology (e.g., flexible printed circuit board technology). The flex board technology provides thin film layers with combined use of thin conductive electrical connections and electrically isolating materials. However, a person skilled in the art would understand that other materials and combination of materials in formation of the film separators 200 can be used. In one embodiment, electrodes of detector array pixels and corresponding channels of amplification and processing electronics 120 are assembled and connected to the same common flexible PCB separator 200. This type of assembly allows making short connections with a low (e.g., minimum) stray capacitance. The common flexible PCB may have provisions for connecting I/O lines for communication with the rest of the system as well as provisions for connecting power to the electronics.

The electrical connection between the thin film separator 200 and the electrodes of the detector array can be accomplished by mechanical pressure or by a more permanent way using solder bonding or conductive glues such as silver epoxy. The permanent attachment, besides providing electrical connections, provides a mechanical connection between the detector and the thin film separator 200. In order to reduce or minimize the thickness of the conductive medium (e.g., solder or conductive glues) between detector electrode and the thin film separator 200, the connection can be made, for example, through a hole within the thin film separator 200. This way, the conductive medium can fill up only a cavity (or hole) in the film separator 200 electrically connecting the detector electrode with a conductive edge of a hole provided in the separator 200. Such a method allows for a permanent electrical connection without the need for a conductive medium to penetrate between the detector and the separator 200 and unnecessarily increase the thickness (or dead space) between linear arrays 100.

Figure 3:
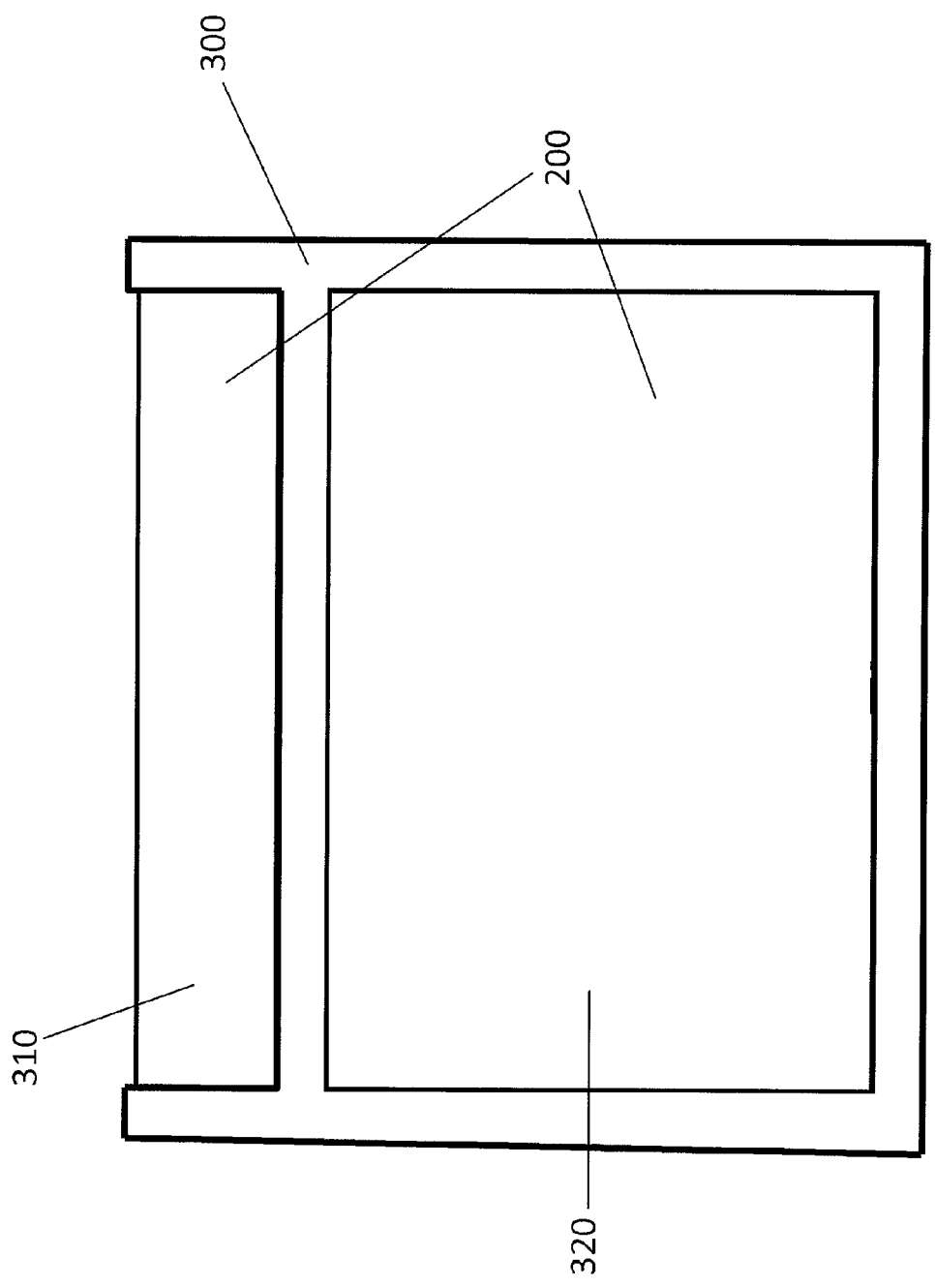
FIG. 3 is a schematic diagram of a frame of a detector card according to one embodiment of the present invention.
Figure 4:
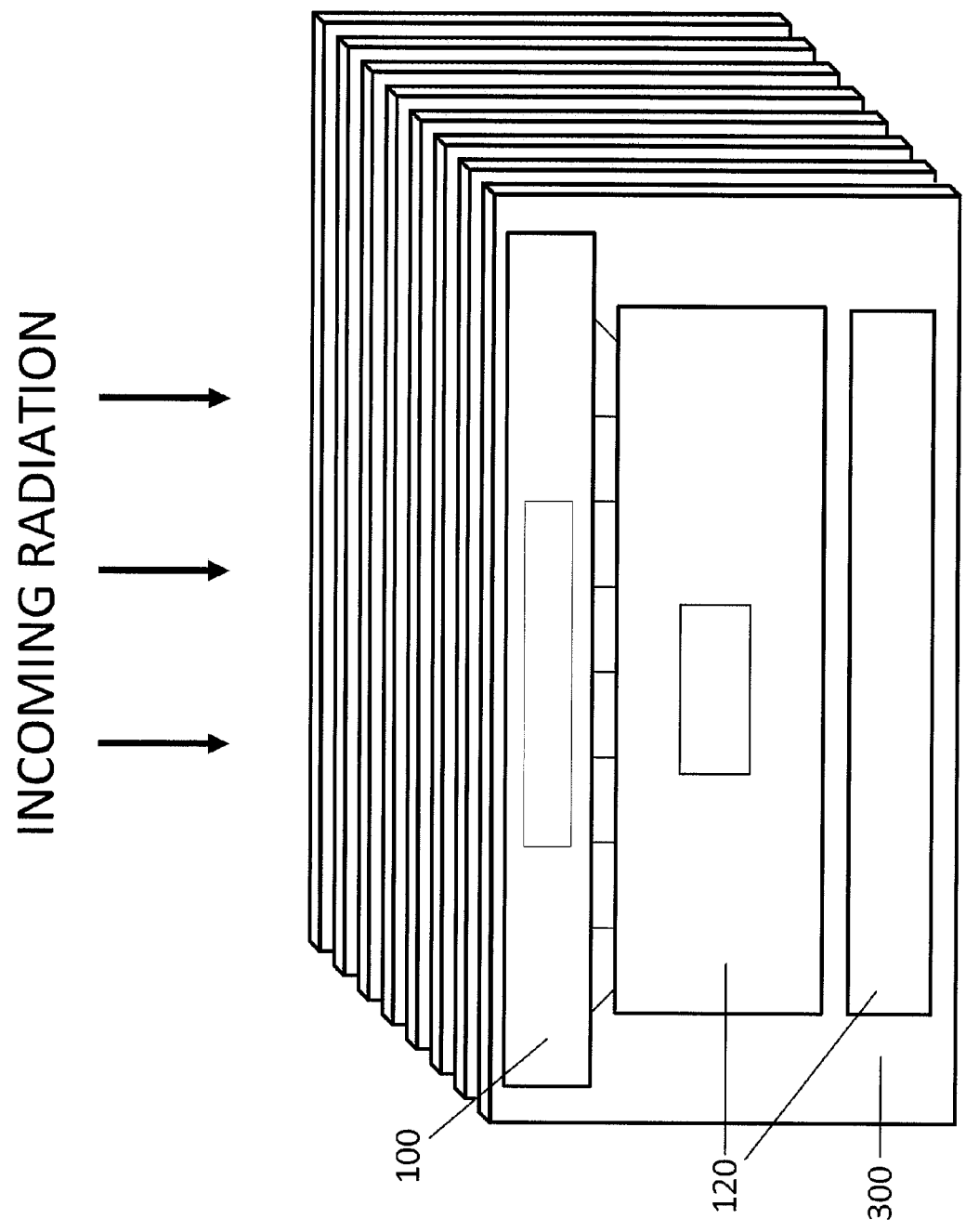
FIG. 4 is a schematic diagram of a stack of detector cards according to one embodiment of the present invention.

In another exemplary embodiment of the present invention, the thin film separators 200 are attached to a hard frame 300 providing cavities 310 and 320 for placement of the linear detector array 100 and the amplification and signal processing electronics 120, respectively (see FIG. 3). The thickness of the hard frame 300 is substantially equal to the thickness of the detector array and all the electronic components have heights smaller than the thickness of the frame 300. This way, the 2D detector array can be assembled from stiff cards and still preserve a very compact construction with reduced (or minimum) dead spaces (see FIG. 4). In one embodiment, the construction of a 2D array composed of stiff cards has benefits during its assembly, troubleshooting, servicing and replacement. The hard frame 300 can be made of metal, plastic or any other material with parameters as called for by the specific design. In one embodiment, the hard frame 300 is produced as a PCB and it is laminated together with the thin film flexible PCB separator 200. Using such a design, it is possible to very conveniently interconnect electrical traces from the flexible PCB to the hard PCB.

Figure 5:
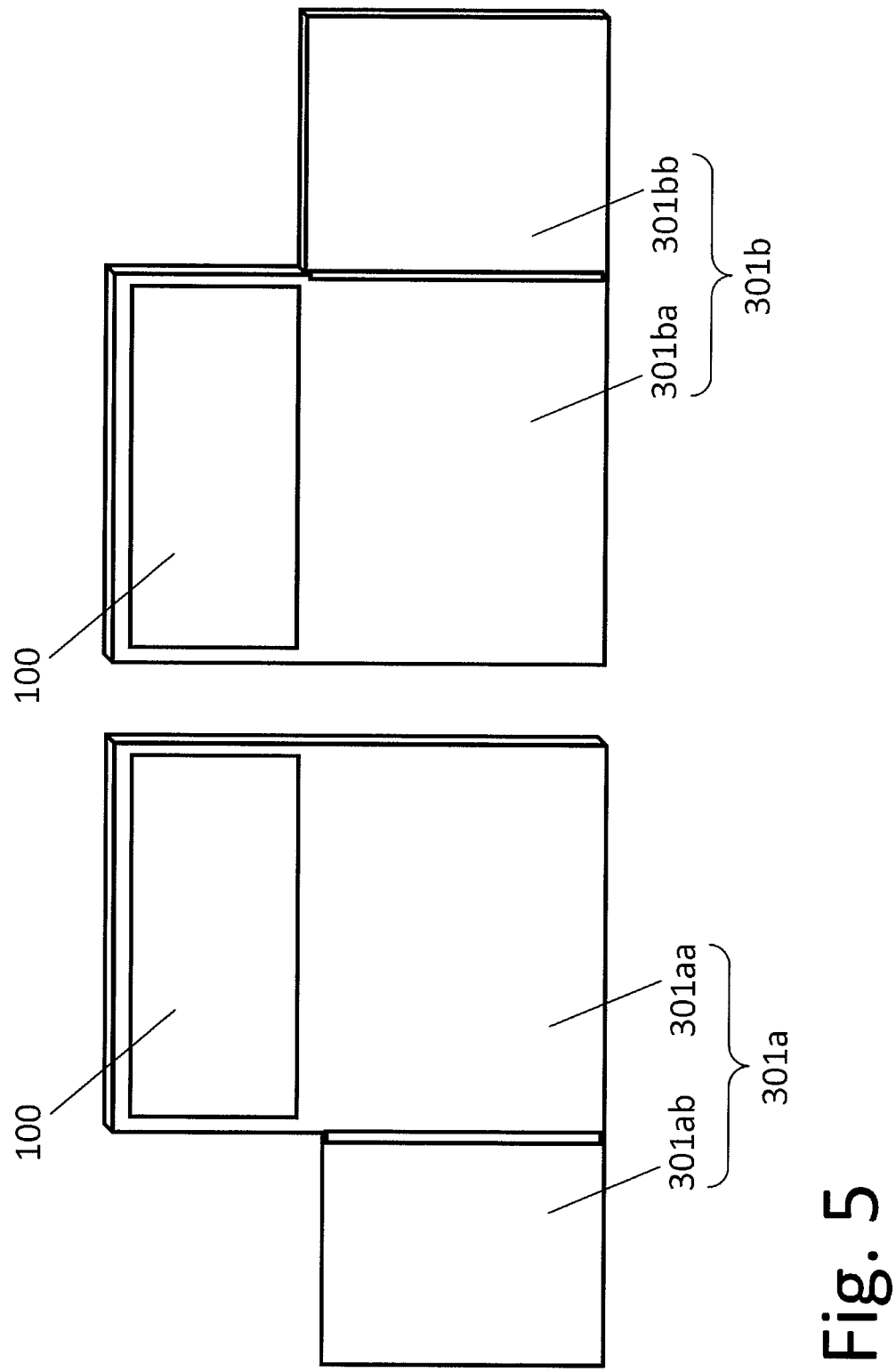
FIG. 5 is a schematic diagram of a left detector card and a right detector card according to one embodiment of the present invention.

In another exemplary embodiment of the present invention, the detector cards are formed as left and right cards 301a and 301b (see FIG. 5) having first and second portions 301aa, 301ba and 301ab, 301bb, allowing for the placement of components with thicknesses close to or larger than the thicknesses of the detector portions (or first portions 301a) of the individual cards. The shapes of the cards are designed to create cavities (for example, in the second portions 301b) accommodating the heights of the components and at the same time maintain a short (or minimum) distance between linear detector arrays 100. Such a configuration allows for alternately stacking many left and right cards into a 2D array with a short (or minimum) distance between pixels regardless of the thicknesses of the associated electronic components. This concept can be extended to more than two types of cards by using appropriate shapes of the cards to accommodate thicker components in the second portions 301b without increasing the distance between the linear detector arrays 100 (or between the pixels).

Figure 6:
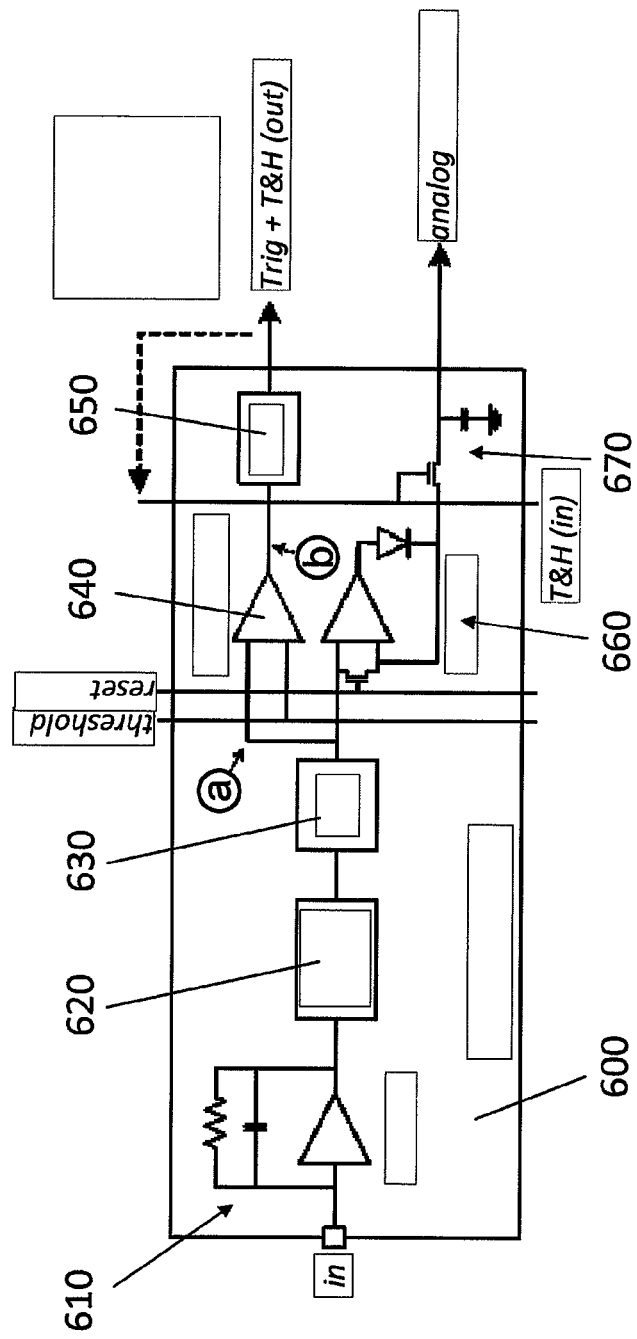
FIG. 6 is a schematic diagram of signal amplification and signal processing circuitry for a single radiation detector according to one embodiment of the present invention.

In another exemplary embodiment, signal amplification and signal processing is accomplished using an Application Specific Integrated Circuit (ASIC) that has 2 or more parallel channels connected to the corresponding detector pixels of the linear array 100. Each of the ASIC channels includes amplification and signal processing electronic circuitry. An example of the ASIC circuitry is shown in FIG. 6. Depending on the application, there is more or less electronic circuitry included in the ASIC.

FIG. 6 shows an example of an ASIC's channel circuitry 600 that is designed to accommodate low noise amplification and signal shaping of the charge signal fed from a corresponding single detector pixel. Furthermore, it embeds functionality to create a digital trigger from the signal event and to sample and temporarily store the peak amplitude of the corresponding amplified and shaped analog signal, as this peak amplitude is proportional to the energy of the X-ray or gamma ray photon that created this event in the first place. The low-noise signal amplification and signal shaping is accomplished through a charge-sensitive preamplifier 610 followed by a time-continuous, so-called CR-RC, filter/gain stage 620 and 630. The digital trigger is accomplished through a level-sensitive discriminator 640 followed by a flip-flop latch 650. Once the amplitude of the shaped signal reaches a pre-set threshold of the discriminator 640, the discriminator output as well as the latch 650 will flip digitally to the opposite level, and the meta-stable latch stays in this position until it is reset by an external control. The detection and storage of the analog peak amplitude is accomplished through a circuitry commonly known as a stretcher 660 followed by an analog track/hold device 670 constituting a switch and a capacitor. Upon a detection of a trigger signal, a strobe is generated and used as the track/hold strobe for the switch in the track/hold device.

Figure 7A:
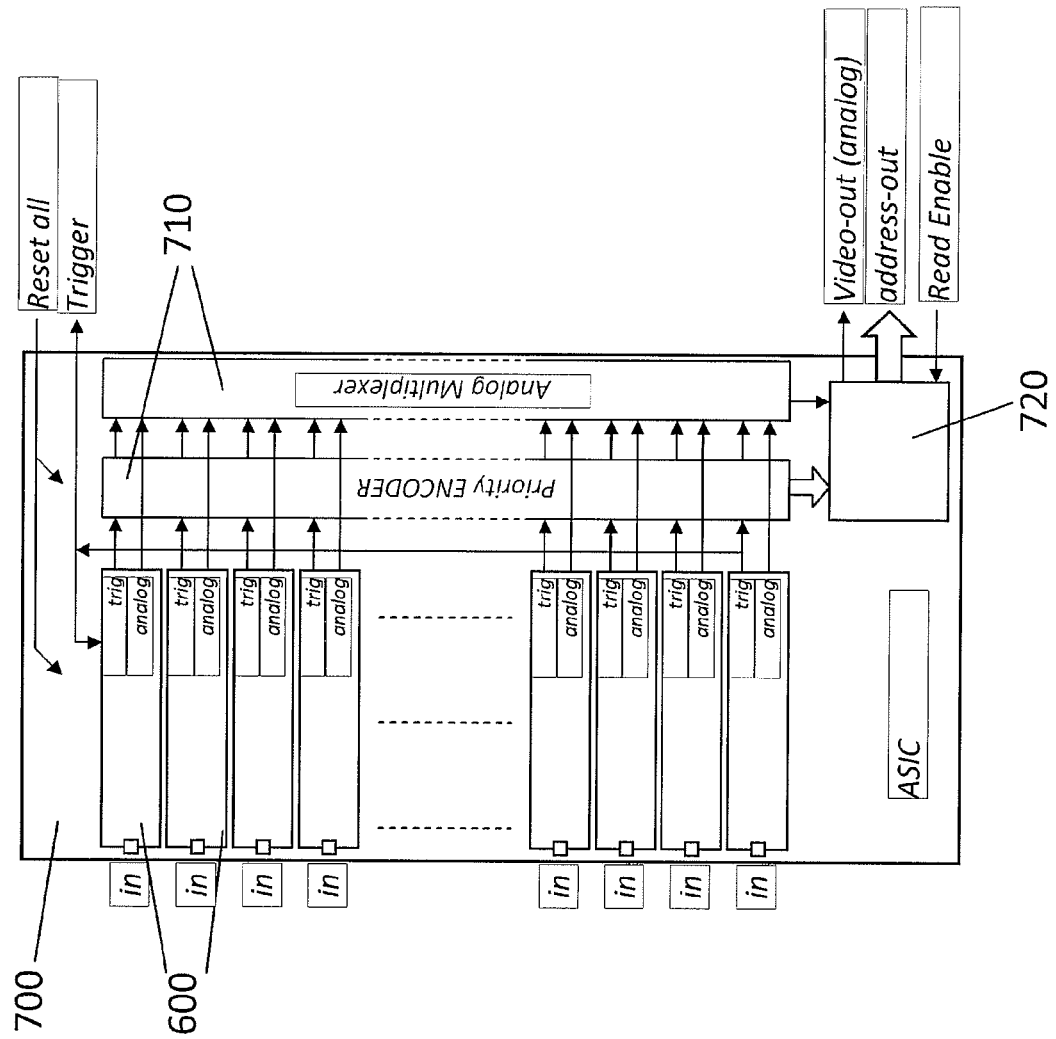
FIGS. 7a, 7b, and 7c are block diagrams of circuitry for operating a plurality of radiation detectors on a detector card according to one embodiment of the present invention.
Figure 7B:
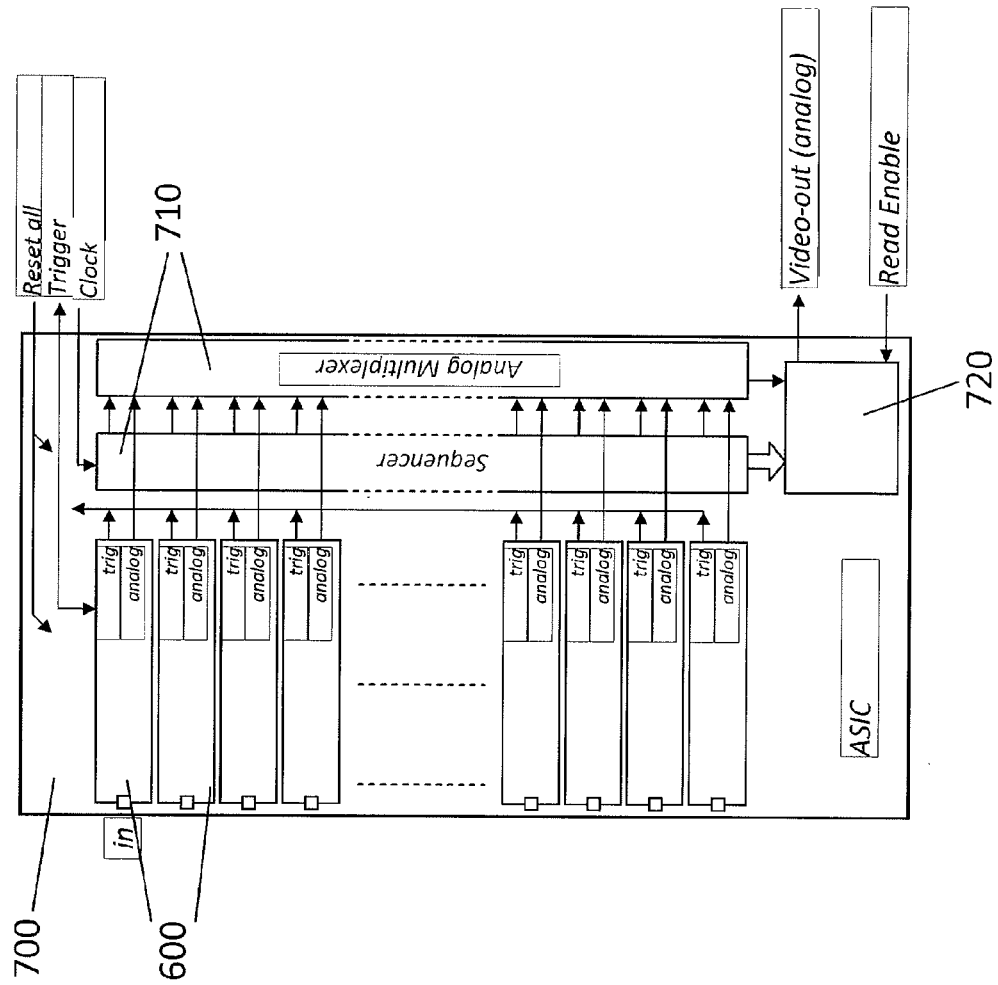
Figure 7C:
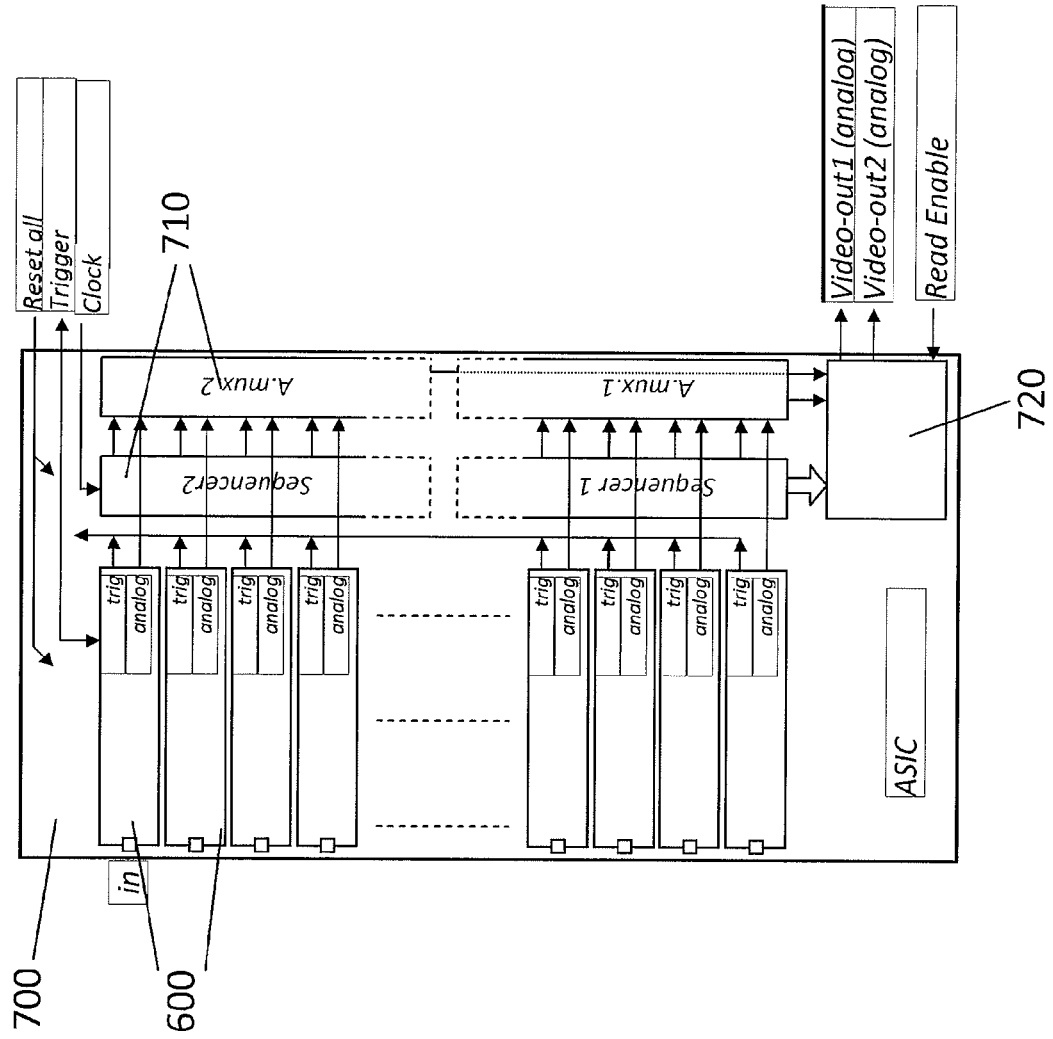

FIGS. 7a, 7b, and 7c illustrate three embodiments of an ASIC chip 700 that embeds an assembly of two or more of the channels 600 described above. The respective inputs are connected to corresponding detector pixels in a linear detector array 100 and each of these pixel-channels operates in parallel and predominantly independently of each other. The ASIC chip 700 also includes a chip-global controller (or tri-state module) 720 and a readout part (or analog multiplexer controlled by a priority encoder or a sequencer (bit-register)) 710 which is common to all the channels, or common to a subset of the channels in embodiments where more than one sequencer type analog multiplexer is used for increased parallelism (see, e.g., FIG. 7c). In one embodiment, when this system is operated, only one of the channels 600 will receive an X-ray or gamma ray event at a given time. Upon such event, the involved channel 600 responds with a digital trigger output (trig) received by simple logic of the chip-global controller 720. In response, the chip-global controller 720 creates a chip-global trigger that in turn produces the following: i) in embodiments including a priority-encoder type analog mulitiplexer (see, e.g., FIG. 7a): 1) all the channels including non-triggered ones will store (through their track/hold circuitry) their analog peak-values of the signal for triggered channel or noise for non-trigged channels and 2) make available the signal value of the trigged channel on an output of the chip for hand-shake with a system controller. ii) In embodiments including a sequencer type analog multiplexer (see, e.g., FIGS. 7b and 7c): 2) in sequence make available the signal values of all the channels (trigged or non-trigged) on one or more outputs of the chip for hand-shake with a system controller.

Figure 8:
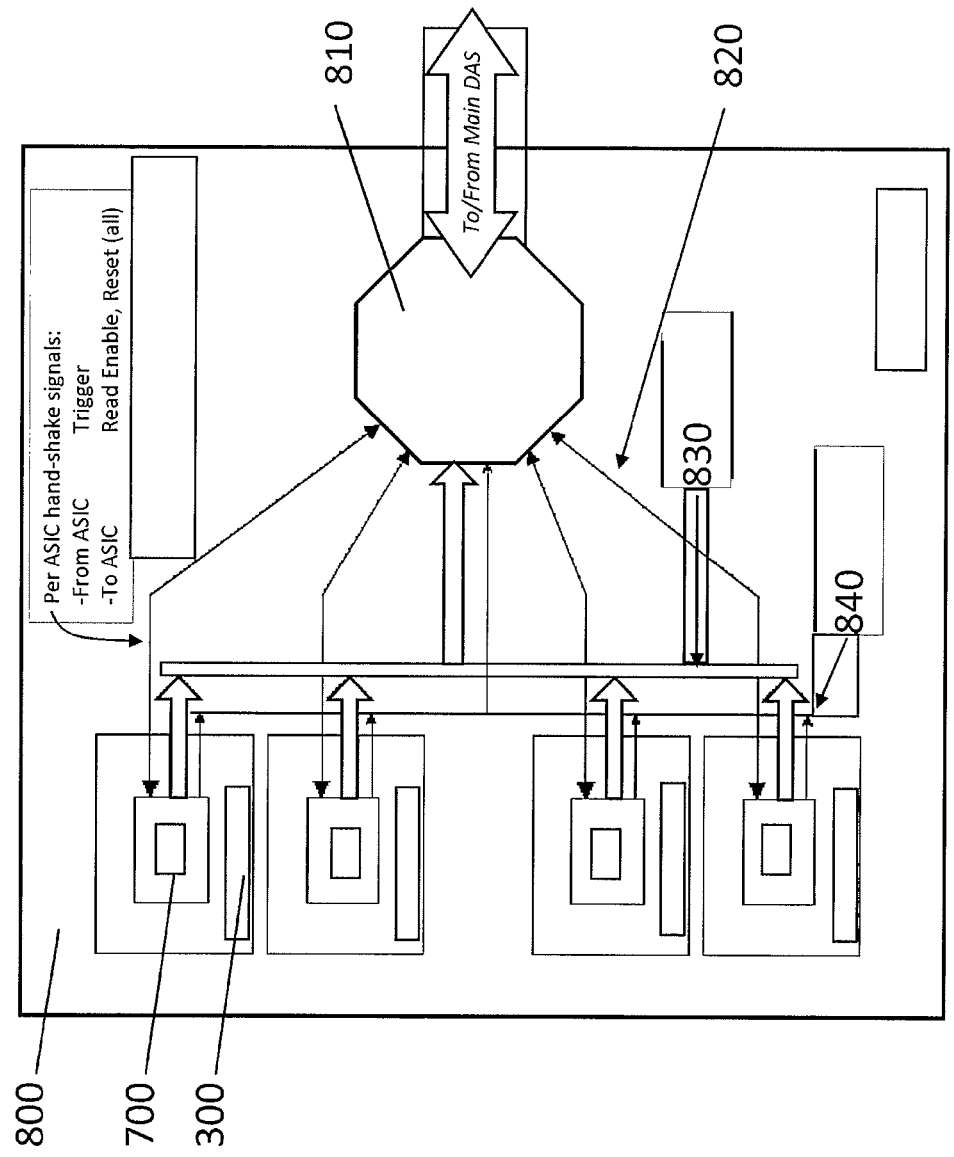
FIG. 8 is a block diagram of a controller for operating a plurality of detector cards according to one embodiment of the present invention.

FIG. 8 shows a system (module) controller 810 which is responsible for control and read-out of a multitude of ASICs from a corresponding multitude of detector cards. The controller has a bi-directional hand-shake link 820 to the ASIC/detector cards which is used for timing of the readout of data. This is to allow sharing of signal data-buses 830 and 840 between the ASICs that in turn allows for significant simplification of data-bus complexity when many detector-cards are used together. The data from each detector card may also be transferred directly to the controller (e.g., without bus-sharing between signal data-buses 830 and 840).

The system controller listens to the "per ASIC hand-shake signal" lines 820 and awaits a trigger output of all the ASICs 700 and upon receiving this trigger from a given ASIC 700, using the "per ASIC hand-shake signal" lines 820, issues a read-enable signal to the ASIC 700 from which the trigger is received. The ASIC controller 720 responds by i): in embodiments including a priority-encoder type analog multiplexer, initiating readout of the channel that caused the trigger. Through arbitration logic this channel is identified and the unique binary address of the channel (preset in a ROM-encoder) along with the sampled analog peak amplitude of the same channel (through a multiplexer), is pushed onto the corresponding digital and analog common data-buses 830 and 840. Or, ii), in embodiments including a sequencer type analog multiplexer, starting a sequential readout of all the channels by switching and transferring one by one channel in a sequential order through the analog multiplexer and onto the analog common bus 840, or, directly to the controller (in this embodiment, the sequential transfer will provide the channel number information). The sequential readout is generally slower than the priority-encoded readout. To compensate for this, it is possible to make subset groups of channels and allow for one sequencer analog multiplexer to each group, operation in parallel (see FIG. 7c). In this embodiment, there may be as many analog outputs on the ASIC as there are subset groups. During the transfer, the analog peak amplitude(s) is/are converted by analog-to-digital (ND) circuitry(s). Upon successful reception of information about the channel address (in case of priority encoded readout type) and the digitized peak amplitude(s) by the system controller 810, the system controller 810, using the "per ASIC hand-shake signal" lines 820, returns a reset signal to the ASIC 700 and makes it ready for a new event capture. The controller 810 may also add information about a corresponding detector card address to a complete data-packet (uniquely identifying which pixel in the full system that was involved in detection of x-ray signal) before the data-packet is pushed or pulled to a overall main data acquisition system (DAS).

In a case where the system controller 810 receives a trigger from a second ASIC in addition to reading out an event from a first ASIC 700, the controller 810 simply keeps the second ASIC on hold until the first ASIC readout is completed. This is possible due to the track/hold and latch function embedded in each channel (FIG. 6) that can keep the data locally until the system controller 810 allows for reading it out. During the waiting period, channels in that ASIC are incapacitated for receiving new events, but the overall architecture depicted in FIG. 8 still reduces (or minimizes) the total dead-time of the full system.

According to one embodiment of the present invention, detectors 100 of a detector array are supplied with power via a common separator on a first side of the detector array and are connected to an amplification and signal processing ASIC on a pixel separator at a second side of the detector array.

FIG. 9a is a schematic plan view of a first side of a common separator 900 according to one embodiment of the present invention. FIG. 9b is a schematic cross sectional view of the common separator of the embodiment of FIG. 9a taken along the line 9b-9b. The common separator 900 includes a plurality of holes 910 for accommodating circuitry (e.g., an ASIC), a detector mount pad 920 which may be coated with an adhesive conductive material, a plurality of spacer holes 930 to accommodate spacers placed between separators, a high voltage circuitry pad 940 for locating high voltage power supply circuitry for supplying power to the detectors 100.

FIG. 10a is a schematic plan view of a second side of the common separator of the embodiment shown in FIG. 9a. FIG. 10b is a schematic side view of the common separator of FIG. 9a with attached detectors and high voltage components, according to one embodiment of the present invention. As seen in FIGS. 10a and 10b, detectors 922 are attached to the detector mount pad 920 and high voltage power supply circuitry 942 is coupled to a region corresponding to the high voltage circuitry pad.

Figure 12A:
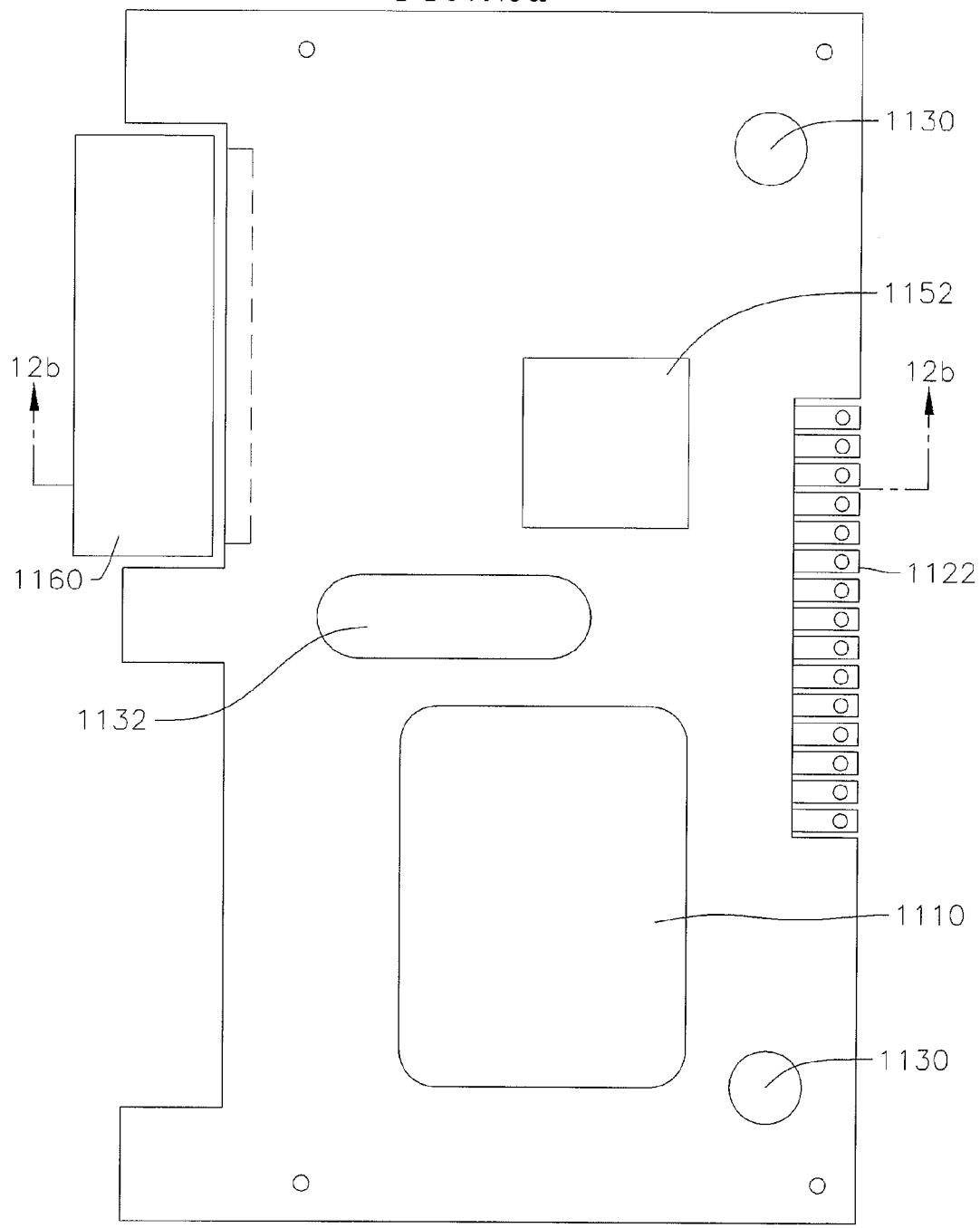
FIG. 12a is a schematic plan view of a pixel separator according to one embodiment of the present invention.
Figure 12B:
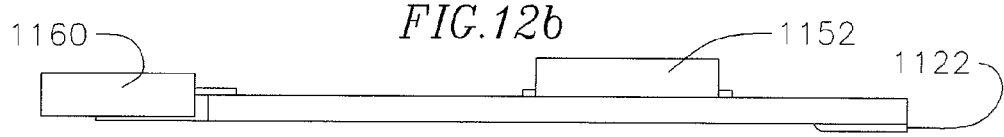
FIG. 12b is a schematic cross sectional view of the pixel separator of the embodiment of FIG. 12a taken along the line 12b-12b.

FIG. 11a is a schematic plan view of a pixel separator according to one embodiment of the present invention. FIG. 11b is schematic a cross sectional view of the pixel separator of the embodiment of FIG. 11a taken along the line 11b-11b. FIG. 12a is a schematic plan view of a pixel separator according to one embodiment of the present invention. FIG. 12b is a schematic cross sectional view of the pixel separator of the embodiment of FIG. 12a taken along the line 12b-12b. The pixel separator 1100 also includes a hole 1110 for accommodating circuitry (e.g., an ASIC), a flex region 1120 for accommodating flex connectors 1122 (or flexible printed circuit connectors) where each of the flex connectors is electrically coupled to a corresponding one of the detectors 100. The pixel separator includes spacer holes 1130 similar to the spacer holes 930 of the common separator 900 and a power supply hole 1132 for accommodating the high voltage power supply circuitry 942. In addition, an ASIC pad 1150 accommodates circuitry including an ASIC 1152. Connectors 1160 are used to communicate signals processed by the ASIC 1152 to external devices.

In one embodiment, the common separator 900, which is coupled to two rows of detectors 100, is sandwiched between two pixel separators 1100. FIG. 13a is a schematic plan view of a first side of an assembly including the common separator 900 of the embodiment FIG. 9a between two pixel separators 1100 of the embodiment of FIG. 11a according to one embodiment of the present invention. FIG. 13b is a schematic view of an edge portion of the assembly of FIG. 13a. FIG. 14a is a schematic plan view of a second side of the assembly of FIG. 13a. FIG. 14b is a schematic view of an edge portion of the assembly of FIG. 13a. As seen in FIGS. 13a and 14a, ASICs 1152 mounted on a corresponding one of the pixel separators 1100 protrude through corresponding holes 910 and 1110. The holes 910 and 1110 allow the assembly to be more compact by accommodating the relatively large height of the ASICs 1152. Similarly, the power supply hole 1132 provides space for the power supply circuitry 942 and allows the assembly as a whole to be more compact. Similarly, gaps in the common separator and the pixel separators provide space for the connectors 1160.

FIG. 15a is a schematic cross sectional view of a plurality of stacked spacer layers and detector boards separated by spacers 1510 taken along the line 15a-15a of FIG. 13a according to one embodiment of the present invention. FIG. 15b is a schematic cross sectional view of a spacer according to one embodiment of the present invention. The spacers 1510 are conductive rings and are lodged in the spacer holes 930 and 1130. A stud 1520 extends through the spacers 1510 such that the assemblies of the detectors 100, the common spacer 900, and the pixel separator 1100 are aligned with one another. The stud 1520 extending through the spacer holes 930 and 1130 located adjacent to the power supply hole 932 and the power supply circuitry 942 is conductive and the conductive stud 1520 is used to supply power to the power supply circuitry 942.

FIG. 16a is a schematic plan view of a mounting plate 1600 according to one embodiment of the present invention. FIG. 16b is a schematic cross sectional view of the mounting plate of FIG. 16a taken along the line 16b-16b. A mounting plate 1600 is located at the top and bottom of a stack of assemblies and includes an isolator 1610 for accommodating the end of the conductive stud 1520 extending through the assemblies in order to reduce the risk of a short circuit.

Also, linear detector array designs can be improved or optimized depending on the application. Pixel size can be selected or optimized to achieve desired capacitance, detection efficiency, charge collection and stability of response in time. For example, smaller capacitance and better charge collection (e.g., through the use of thicker structures) allows the detector array to achieve better energy resolution in x-ray and gamma-ray spectroscopy applications. Further, thinner structures help with charge collection and stability of response in time (for CdTe Shottky or CdTe p-i-n). However, these thinner structures might suffer from increased capacitance. Smaller pixels in 2D array with the same field of view allow better spatial resolution but increase the cost due to using more electronic channels to process signals and more complicated assembly. Embodiments of the present invention can be customized or optimized in the detector design for variety of applications such as imaging, detection and spectroscopy of ionizing radiation.

While the present invention has been described in reference to certain exemplary embodiments, it is to be understood to those skilled in the art that the invention is not limited to the disclosed embodiments, but, on the contrary, is intended to cover various modifications included within the spirit and scope of the appended claims and equivalents thereof.

What is claimed is:

1. A two dimensional radiation detector array comprising:
   a plurality of detector cards, each of the detector cards comprising:
      a plurality of radiation detectors arranged in a linear array having a single row of radiation detectors arranged across a direction of incoming radiation; and
      a plurality of amplifiers, each of the amplifiers being electrically coupled to a respective one of the plurality of radiation detectors; and
   a separator between first and second detector cards of the plurality of detector cards.

2. The two dimensional radiation detector array of claim 1, wherein each of the detector cards is coupled to a first separator at a first side and a second separator at a second side, the first separator being adapted to electrically couple the plurality of radiation detectors to the plurality of amplifiers at the first side and the second separator being adapted to supply a bias voltage to the plurality of radiation detectors at the second side.

3. The two dimensional radiation detector array of claim 1, wherein the separator is a common separator and is adapted to provide a bias voltage to the radiation detectors of the first and second detector cards.

4. The two dimensional radiation detector array of claim 3, further comprising a first pixel separator and a second pixel separator,
   wherein the first pixel separator is located at a side of the first detector card opposite the common separator and electrically couples the plurality of radiation detectors of the first detector card to the plurality of amplifiers of the first detector card, and
   wherein the second pixel separator is located at a side of the second detector card opposite the common separator and electrically couples the plurality of radiation detectors of the second detector card to the plurality of amplifiers of the second detector card.

5. The two dimensional radiation detector array of claim 1, wherein the separator comprises a hard printed circuit board, a flexible printed circuit board, or a combination thereof.

6. The two dimensional radiation detector array of claim 1, wherein each of the detector cards further comprises a frame adapted to accommodate the plurality of radiation detectors and the plurality of amplifiers and processing electronics.

7. The two dimensional radiation detector array of claim 1, wherein the separator is a common separator and is adapted to electrically couple the plurality of radiation detectors of the first card to the plurality of amplifiers of the first detector card and to electrically couple the plurality of radiation detectors of the second detector card to the plurality of amplifiers of the second detector card.

8. The two dimensional radiation detector array of claim 1, wherein:
   each of the detector cards comprises a first edge and a second edge; and
   the plurality of amplifiers of the first detector card is located at the first edge of the first detector card and the plurality of amplifiers of the second detector card is located at the second edge of the second detector card.

9. The two dimensional radiation detector array of claim 1, wherein each of the detector cards has a first portion and a second portion, the second portion being thicker than the first portion.

10. The two dimensional radiation detector array of claim 9, wherein each of the detector cards has a first edge and a second edge, the plurality of radiation detectors of each of the detector cards is located at the first portion of a corresponding detector card of the detector cards, and the plurality of amplifiers is located at the second portion of the corresponding detector card,
   wherein the second portion of the first detector card is located at the first edge of the first detector card and the second portion of the second detector card is located at the second edge of the second detector card.

11. The two dimensional radiation detector array of claim 1, wherein each of the radiation detectors comprises a detector structure in an edge-on detector configuration.

12. The two dimensional radiation detector array of claim 11, wherein the detector structure comprises CdTe or CZT.

13. The two dimensional radiation detector array of claim 1, wherein the separator is adapted to supply a bias voltage to the second detector card.

14. The two dimensional radiation detector array of claim 1, wherein the detector array further comprises another separator located between the separator and the second detector card.

15. The two dimensional radiation detector array of claim 14, wherein the another separator is adapted to supply a bias voltage to the second detector card.

16. The two dimensional radiation detector array of claim 1, wherein the separator has a hole adapted to accommodate a conductive medium to electrically couple a radiation detector of the radiation detectors to the separator.

17. The two dimensional radiation detector array of claim 1, wherein the plurality of amplifiers is configured to amplify and shape a signal from a radiation detector of the radiation detectors.

18. The two dimensional radiation detector array of claim 17, wherein the plurality of amplifiers is further configured to generate a trigger when radiation is detected and to store a peak amplitude of the amplified and shaped signal.

19. The two dimensional radiation detector array of claim 18, wherein the plurality of amplifiers comprises a plurality of channels, each of the channels corresponding to a corresponding one of the radiation detectors.

20. The two dimensional radiation detector array of claim 19, wherein each of the detector cards further comprises a chip global controller configured to supply a global trigger in response to the trigger, and wherein each of the plurality of channels is configured to store the amplitude of the signal detected by its corresponding one of the radiation detectors in response to the global trigger.

21. The two dimensional radiation detector array of claim 20, wherein the chip global controller is further configured to output the peak amplitude of the amplified and shaped signal.

22. The two dimensional radiation detector of claim 21, further comprising a system controller configured to read the stored peak amplitude of the pluralities of amplifiers of the plurality of detector cards.

* * * * *